US012603813B2

(12) United States Patent
Rajagopal et al.

(10) Patent No.: US 12,603,813 B2
(45) Date of Patent: Apr. 14, 2026

(54) CLOUD AUTOMATION AGENTS AND METHOD OF USE

(71) Applicant: RELIANCE JIO INFOCOMM USA, INC., Frisco, TX (US)

(72) Inventors: Arun Rajagopal, Frisco, TX (US); Abhijeet Singh, Seattle, WA (US); Venugopal Kanumalla, Frisco, TX (US)

(73) Assignee: RELIANCE JIO INFOCOMM USA, INC., Frisco, TX (US)

( * ) Notice: Subject to any disclaimer, the term of this patent is extended or adjusted under 35 U.S.C. 154(b) by 277 days.

(21) Appl. No.: 17/750,473

(22) Filed: May 23, 2022

(65) Prior Publication Data

US 2023/0379208 A1 Nov. 23, 2023

(51) Int. Cl.
*H04L 41/0803* (2022.01)
*H04L 67/10* (2022.01)

(52) U.S. Cl.
CPC .......... *H04L 41/0803* (2013.01); *H04L 67/10* (2013.01)

(58) Field of Classification Search
CPC ............................ H04L 41/0803; H04L 67/10
See application file for complete search history.

(56) References Cited

U.S. PATENT DOCUMENTS

| | | | |
|---|---|---|---|
| 7,523,892 B2 | 4/2009 | Cook | |
| 7,685,083 B2 | 3/2010 | Fairweather | |
| 7,689,510 B2 | 3/2010 | Lamkin et al. | |
| 8,112,176 B2 | 2/2012 | Solomon | |
| 8,566,115 B2 | 10/2013 | Moore | |
| 8,958,662 B1 | 2/2015 | Grosz et al. | |
| 9,367,362 B2 | 6/2016 | Kern | |
| 9,692,707 B2 | 6/2017 | Tang et al. | |
| 9,740,757 B1 | 8/2017 | Gilder et al. | |
| 9,794,370 B2 | 10/2017 | Abbasi et al. | |
| 9,911,290 B1 | 3/2018 | Zalewski et al. | |
| 9,960,637 B2 | 5/2018 | Sanders et al. | |
| 10,221,013 B2 | 3/2019 | Buzan et al. | |
| 10,346,621 B2 | 7/2019 | Athuluru Tlrumala et al. | |
| 10,740,293 B2 | 8/2020 | Maturana et al. | |
| 10,746,428 B2 | 8/2020 | Przybylski et al. | |
| 10,769,231 B2 | 9/2020 | Kol et al. | |
| 10,778,534 B2 | 9/2020 | Chitalia et al. | |
| 10,834,562 B1 | 11/2020 | Zalewski et al. | |
| 10,867,282 B2 | 12/2020 | Glunz | |
| 10,999,163 B2 | 5/2021 | Abraham | |

(Continued)

OTHER PUBLICATIONS

Notification of the International Search Report and the Written Opinion of the International Search Authority—The European Patent Office—mailed Sep. 8, 2023, for PCT/US23/23093, 14 pages.

*Primary Examiner* — Hua Fan
(74) *Attorney, Agent, or Firm* — Jackson Walker LLP; Christopher J. Rourk

(57) ABSTRACT

A system for configuring a network, comprising a network software installation system operating on a first processor and configured to install a current version of one or more algorithms on each of a plurality of site-specific hardware items and to configure each of the plurality of site-specific hardware items to interoperate with each other. An agent operating on a second processor is configured to modify the one or more algorithms for one of the plurality of site-specific hardware items using an out of band network.

20 Claims, 4 Drawing Sheets

(56)　　　　　References Cited

U.S. PATENT DOCUMENTS

| 10,999,251 | B2 | 5/2021 | Miriyala et al. |
| 11,124,361 | B2 | 9/2021 | Lert et al. |
| 11,138,539 | B2 | 10/2021 | Sethi et al. |
| 11,189,368 | B2 | 11/2021 | Heath |
| 11,336,515 | B1 | 5/2022 | Mehta et al. |
| 2007/0093970 | A1 | 4/2007 | Padmanabhan et al. |
| 2011/0246627 | A1 | 10/2011 | Kern |
| 2016/0189174 | A1 | 6/2016 | Heath |
| 2017/0177324 | A1 | 6/2017 | Frank et al. |
| 2017/0228228 | A1 | 8/2017 | Lin |
| 2018/0052451 | A1 | 2/2018 | Billi-Duran et al. |
| 2019/0109810 | A1 | 4/2019 | Rapaport et al. |
| 2019/0140580 | A1 | 5/2019 | Poivet |
| 2019/0332785 | A1 | 10/2019 | Athuluru Tlrumala |
| 2020/0133666 | A1 | 4/2020 | Prinsloo et al. |
| 2020/0136930 | A1 | 4/2020 | Szulman et al. |
| 2021/0019194 | A1 | 1/2021 | Bahl et al. |
| 2021/0168046 | A1 | 6/2021 | Madala et al. |
| 2021/0224061 | A1* | 7/2021 | Pillilli ................... G06F 21/572 |
| 2021/0389338 | A1 | 12/2021 | Kochar et al. |
| 2022/0129258 | A1* | 4/2022 | Ladkani ............. G06F 11/2007 |

* cited by examiner

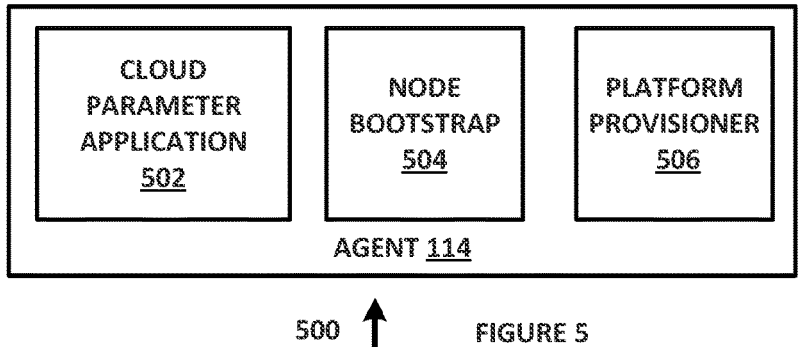
| CLOUD PARAMETER APPLICATION 502 | NODE BOOTSTRAP 504 | PLATFORM PROVISIONER 506 |
AGENT 114
500 ↑     FIGURE 5
INTERFACE WITH NETWORK ELEMENT
602
READ NETWORK ELEMENT DATA FROM SITE CONFIGURATION
604
GAPS     NO
606
YES
REPLACE?     NO
610
YES
SELECT REPLACEMENT          CONFIGURE
612                            614
CREATE CONFIGURATION SCRIPTS
616
RUN CONFIGURATION SCRIPTS
618
PROVISION NETWORK ELEMENT
620
YES     ADDITIONAL ELEMENTS?     NO
622
END
608
FIGURE 6     600 ↑

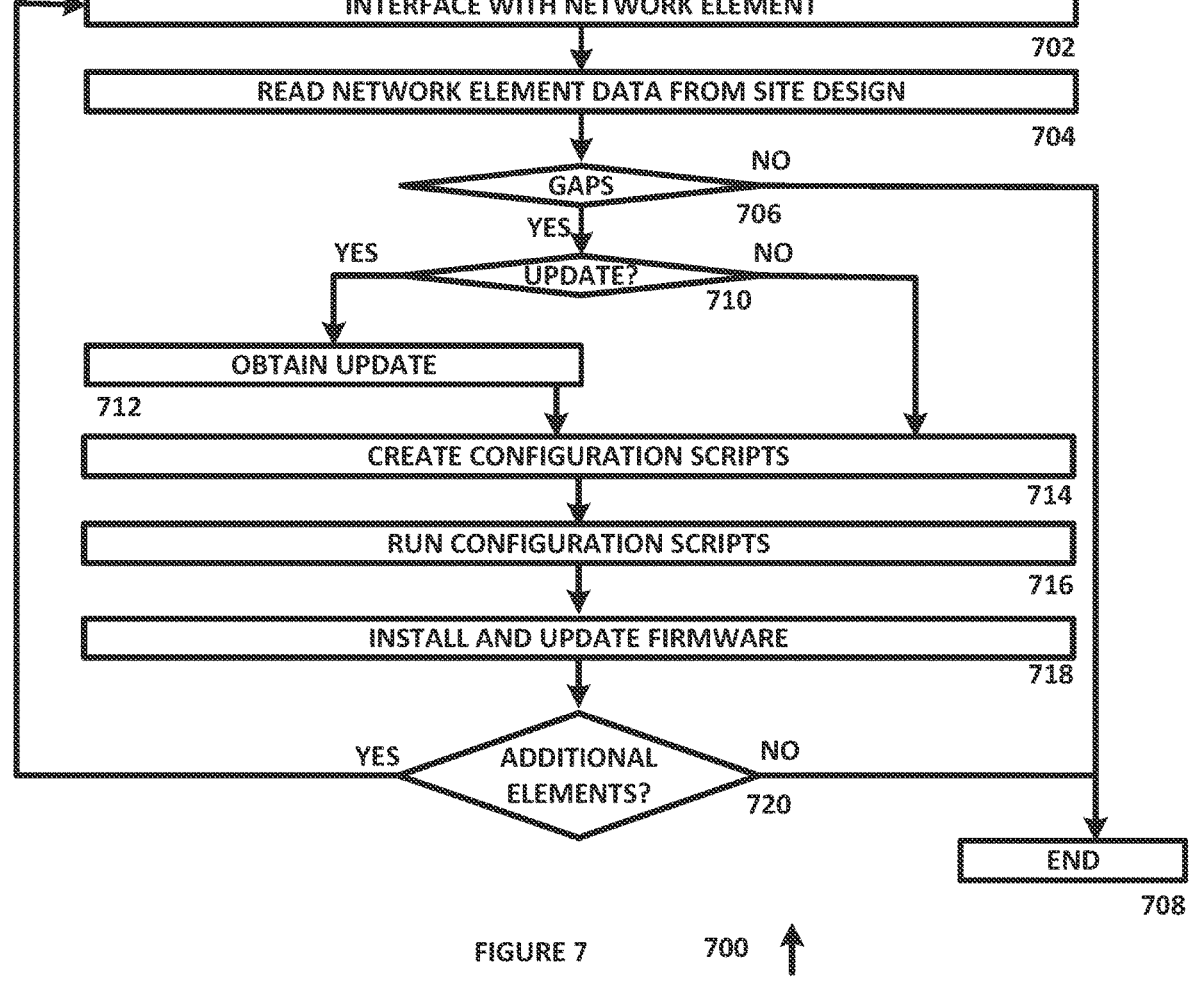
FIGURE 7     700

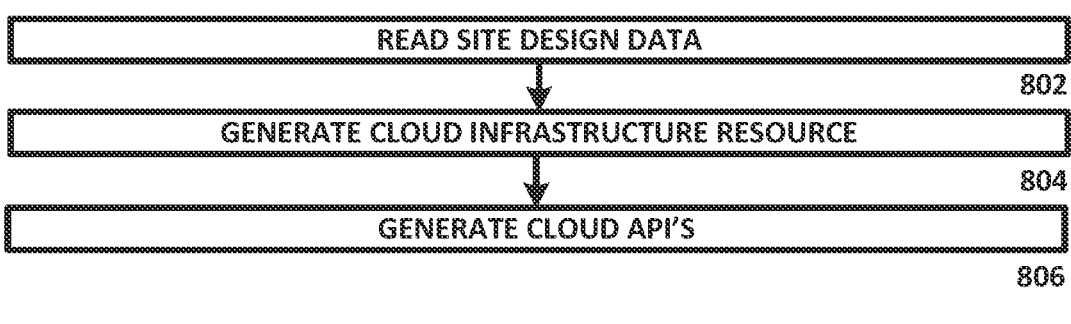
READ SITE DESIGN DATA
802
GENERATE CLOUD INFRASTRUCTURE RESOURCE
804
GENERATE CLOUD API'S
806
FIGURE 8          800

CLOUD AUTOMATION AGENTS AND METHOD OF USE

RELATED APPLICATIONS

This non-provisional application is related to U.S. patent application Ser. No. 17/689,430 filed Mar. 8, 2022 entitled "CLOUD AUTOMATION SITE DESIGN AND METHOD", and is related to U.S. patent application Ser. No. 17/713,490 filed Apr. 5, 2022 entitled "CLOUD AUTO-MATION MICROBOTS AND METHOD OF USE", and is related to U.S. patent application Ser. No. 17/734,480 filed May 2, 2022 entitled "AUTOMATED BOT FOR ERROR-FREE RACKING-STACKING", which are hereby incorpo-rated by reference for all purposes, as if presented herein in their entireties.

TECHNICAL FIELD

The present disclosure relates generally to cloud comput-ing, and more specifically to a system and method of cloud automation site design and a method of use.

BACKGROUND OF THE INVENTION

Cloud computing refers to an architecture that allows the specific hardware for an application to be dynamically configured on demand without the need for any specification by the user.

SUMMARY OF THE INVENTION

A system for configuring a network, comprising a net-work software installation system operating on a first pro-cessor and configured to install a current version of one or more algorithms on each of a plurality of site-specific hardware items and to configure each of the plurality of site-specific hardware items to interoperate with each other. An agent such as a cloud automation agent operating on a second processor is configured to modify the one or more algorithms for one of the plurality of site-specific hardware items using an out of band network.

Other systems, methods, features, and advantages of the present disclosure will be or become apparent to one with skill in the art upon examination of the following drawings and detailed description. It is intended that all such addi-tional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals desig-nate corresponding parts throughout the several views, and in which:

FIG. 2 is a diagram of a cloud software installation and update system, in accordance with an example embodiment of the present disclosure;

FIG. 3 is a diagram of a site data configuration system, in accordance with an example embodiment of the present disclosure;

FIG. 4 is a diagram of a site physical configuration system, in accordance with an example embodiment of the present disclosure;

FIG. 5 is a diagram of an agent, in accordance with an example embodiment of the present disclosure;

FIG. 6 is a diagram of an algorithm for network element configuration for a cloud computing system, in accordance with an example embodiment of the present disclosure;

FIG. 7 is a diagram of an algorithm for network element data update, in accordance with an example embodiment of the present disclosure; and FIG. 8 is a diagram of an algorithm for generating cloud computing APIs, in accordance with an example embodi-ment of the present disclosure.

DETAILED DESCRIPTION OF THE INVENTION

Figure 1:
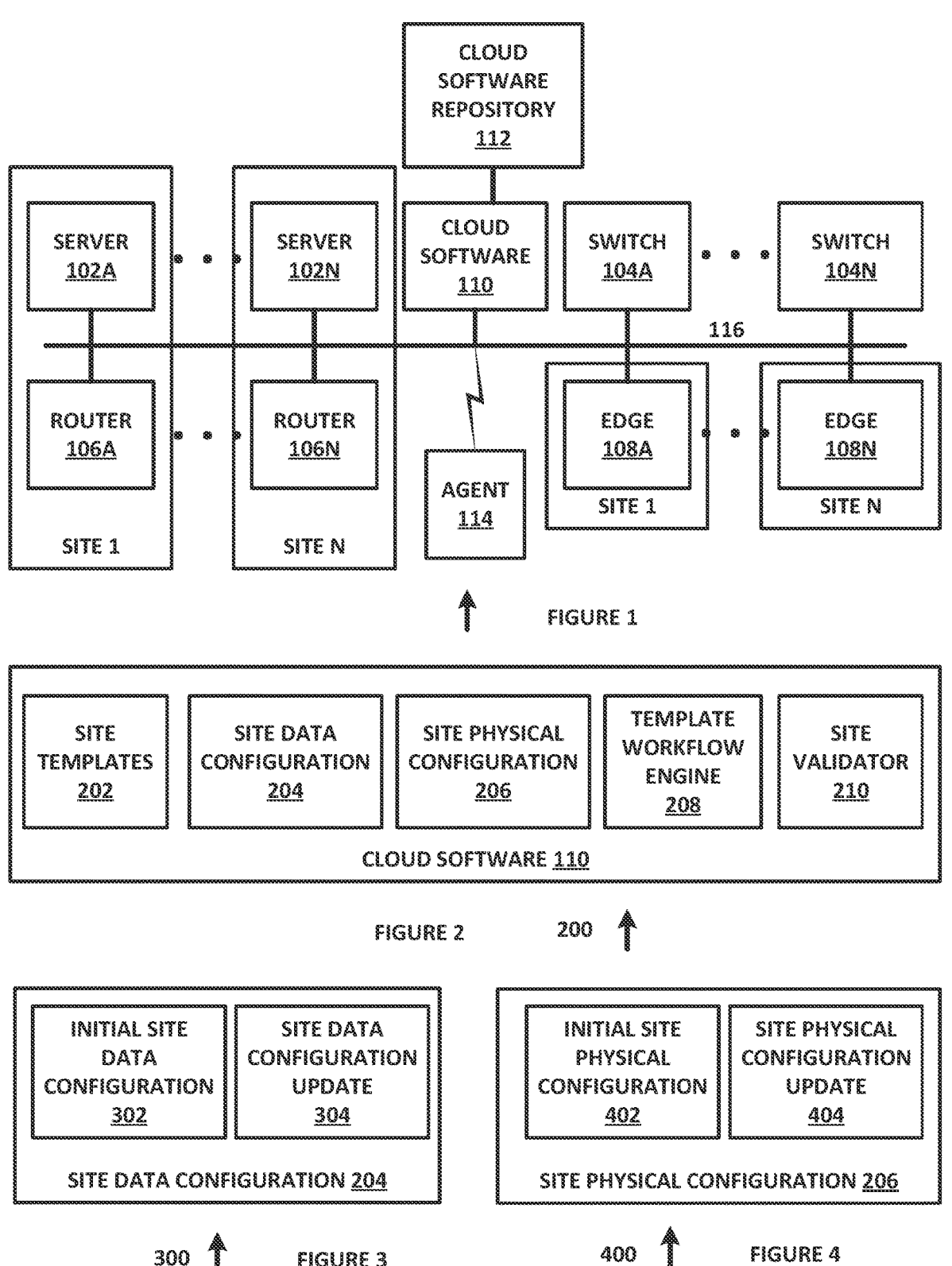
FIG. 1 is a diagram of a system for cloud computing site hardware and automated cloud software installation for an entire cloud computing system, in accordance with an example embodiment of the present disclosure.

In the description that follows, like parts are marked throughout the specification and drawings with the same reference numerals. The drawing figures may be to scale and certain components can be shown in generalized or sche-matic form and identified by commercial designations in the interest of clarity and conciseness.

The present disclosure is related to systems and algorith-mic processes that are typically implemented in software that operates on a processor, to enable telecom operators and other network operators to fully mechanize the process of installing and configuring hardware and associated software for a cloud computing environment or other suitable com-puting or telecommunications environments, such as serv-ers, switches, routers, edge servers, networking software, server software, patch cabling, radio band units and other hardware and software used for build and operations of distributed telecommunications company cloud and edge infrastructure. The present disclosure provides the technical features of enabling telecom operators and hardware Origi-nal Equipment Manufacturer (OEM) partners to provide a consistent and reliable experience to the end consumer of the cloud computing environment by enabling error free deploy-ment of hardware and software elements.

In one example embodiment, the disclosed automation system and algorithmic processes can be used by an OEM vendor to rack, stack and deliver hardware to a customer, to install the hardware without any errors or re-runs, to con-figure the hardware with associated software, to resolve complex logistics challenges, to configure data centers, mobility locations, remote edge locations or to provide other suitable functions. The present disclosure can be used to provide on-demand infrastructure racking layout, automated workflows and other suitable functions. The present disclo-sure can include an application that runs on a mobile device or laptop computer, to assist an installer and also to certify the installed system components and to provide sign-off for the work after it has been completed.

The present disclosure can be implemented using com-ponents that run centrally and provide a dashboard with target design configurations of hardware to be stacked and a smart application that runs on a mobile device, either connected or in a disconnect mode, as well as other suitable configurations. In one example embodiment, machine learning models can be used to detect physical networking connections such as RJ45 compatible devices, fiber optic media, small form factor pluggable devices, coaxial compatible devices, HDMI devices and so forth, to interpret design information that is obtained from a cloud software repository, to validate a configuration state and to perform other suitable functions, such as to determine whether a device is plugged in to a port or not, if it is in the right port as per the design specification, whether the software applications installed on the device are correct and are configured correctly and other suitable functions. A workflow running on the remote agent can be used to finalize the racking-stacking in a series of steps, such as where a user can generate image or video data that is analyzed to determine whether equipment is in a proper configuration, where machine learning can instruct the user to perform a next action based upon success on current step and in other suitable embodiments.

FIG. 1 is a diagram of a system 100 for cloud computing site hardware and automated cloud software installation for an entire cloud computing system, in accordance with an example embodiment of the present disclosure. System 100 includes servers 102A though 102N, switches 104A through 104N, routers 106A through 106N, edge servers 108A through 108N, cloud software installation and maintenance system 110, cloud software repository 112 and agent 114, which are coupled over network 116, and which can be implemented as a wireline data communications medium, a wireless data communications medium, an optical data communications medium, other suitable data communications media or a suitable combination of data communications media.

Servers 102A though 102N can be implemented as separate hardware enclosures containing individual systems, separate hardware racks containing multiple system elements such as blades or cards, individual system elements such as blades or cards or other suitable systems or devices that are used in a cloud computing environment to provide cloud computing services upon demand. Servers 102A though 102N can be implemented at a single site, or at a plurality of different sites, such as where each server 102A through 102N is at a dedicated site 1 through site N as shown, where groups of servers 102A through 102N are at two or more different sites, where the number of different sites is less than the total number of servers, or in other suitable embodiments. Servers 102A though 102N can include one or more processors, one or more memory devices, input/output devices, network interfaces and other suitable components to allow them to be installed in a cloud computing system and automatically configured by cloud software system 110 or in other suitable manners to provide cloud computing services.

Switches 104A through 104N can be implemented as separate hardware enclosures containing individual systems, separate hardware racks containing multiple system elements such as blades or cards, individual system elements such as blades or cards or other suitable systems or devices that are used in a cloud computing environment to provide network switching services upon demand, including wireless data switching, wireline data switching, fiber optic data switching, a suitable combination of switching functions or other suitable data switching functions. Switches 104A though 104N can be implemented at a single site, or at a plurality of different sites, such as where each switch 104A through 104N is at a dedicated site 1 through site N as shown, where groups of switches 104A through 104N are at two or more different sites, where the number of different sites is less than the total number of servers, or in other suitable embodiments. The sites associated with servers 102A though 102N can be the same as the sites associated with switches 104A through 104N, can be different, or can include a suitable combination of dedicated sites and shared sites. Switches 104A through 104N can include one or more processors, one or more memory devices, input/output devices, network interfaces and other suitable components to allow them to be installed in a cloud computing system and automatically configured by cloud software system 110 or in other suitable manners to provide network switching for a cloud computing environment.

Routers 106A through 106N can be implemented as separate hardware enclosures containing individual systems, separate hardware racks containing multiple system elements such as blades or cards, individual system elements such as blades or cards or other suitable systems or devices that are used in a cloud computing environment to provide network routing services upon demand. Routers 106A though 106N can be implemented at a single site, or at a plurality of different sites, such as where each router 106A through 106N is at a dedicated site 1 through site N as shown, where groups of routers 106A through 106N are at two or more different sites, where the number of different sites is less than the total number of servers, or in other suitable embodiments. The sites associated with servers 102A though 102N and/or switches 104A through 104N can be the same as the sites associated with routers 106A through 106N, can be different, or can include a suitable combination of dedicated sites and shared sites. Routers 106A through 106N can include one or more processors, one or more memory devices, input/output devices, network interfaces and other suitable components to allow them to be installed in a cloud computing system and automatically configured by cloud software system 110 or in other suitable manners to provide network routing for a cloud computing environment.

Edge servers 108A through 108N can be implemented as separate hardware enclosures containing individual systems, separate hardware racks containing multiple system elements such as blades or cards, individual system elements such as blades or cards or other suitable systems or devices that are used in a cloud computing environment to provide edge network services upon demand. Edge servers 108A though 108N can be implemented at a single site, or at a plurality of different sites, such as where each edge server 108A through 108N is at a dedicated site 1 through site N as shown, where groups of edge servers 108A through 108N are at two or more different sites, where the number of different sites is less than the total number of servers, or in other suitable embodiments. The sites associated with servers 102A though 102N and/or switches 104A through 104N and/or routers 106A through 106N can be the same as the sites associated with edge servers 108A through 108N, can be different, or can include a suitable combination of dedicated sites and shared sites. Edge servers 108A through 108N can include one or more processors, one or more memory devices, input/output devices, network interfaces and other suitable components to allow them to be installed in a cloud computing system and automatically configured by cloud software system 110 or in other suitable manners to provide edge network services for a cloud computing environment.

Cloud software installation and maintenance system 110 can be implemented as one or more algorithms operating on a processor that cause the processor to interact with servers 102A though 102N, switches 104A through 104N, routers 106A through 106N, edge servers 108A through 108N and other components, to install algorithms, applications and other instructions, to configure servers 102A though 102N, switches 104A through 104N, routers 106A through 106N, edge servers 108A through 108N and other components with a site data configuration and a site physical configuration, and to perform other suitable functions. In one example embodiment, cloud software installation and maintenance system 110 can be implemented using GITOPS from GIT-LAB, located in San Francisco, CA, or other suitable software installation and maintenance systems. Cloud software installation and maintenance system 110 can install specific algorithms on specific predetermined components, such as to configure and provision specific servers to interoperate with other specific servers, specific switches to interoperate with specific servers, specific routers to interoperate with specific servers and switches, specific edge routers to interoperate with specific servers, routers and switches and so forth, so as to provide a fully-configured and provisioned cloud computing system, data communications network or other suitable systems with minimal operator involvement.

Cloud software repository 112 can be implemented as one or more algorithms operating on a processor that cause the processor to provide operational code for servers 102A though 102N, switches 104A through 104N, routers 106A through 106N, edge servers 108A through 108N and other suitable equipment, to maintain and modify algorithms, applications and other instructions, to provide configuration information for use with servers 102A though 102N, switches 104A through 104N, routers 106A through 106N, edge servers 108A through 108N and other suitable components with a site data configuration and a site physical configuration, and to perform other suitable functions. In one example embodiment, cloud software repository 112 can be implemented using GITHUB from GITLAB, located in San Francisco, CA, or other suitable software development and version control systems.

Agent 114 can be implemented as one or more algorithms operating on a processor that cause the processor to interact with cloud software installation and maintenance system 110 and other components of system 100. In one example embodiment, a user can access each component locally and over network 116 to verify that the component has been properly installed and provisioned, such as by using the algorithmic processes and functionality disclosed here or other suitable functionality.

In operation, system 100 provides predefined tasks, allowable site configurations, allowable network details, allowable hardware details, allowable software details and other suitable data for a cloud network installation or other suitable systems. A network design document can be provided in an easy to read format, such as a markup language like XML, yet another markup language (YAML) or other suitable formats that are easy for a human operator to read, and which can be used to implement the process of cloud computing network deployment. In one example embodiment, the design document can include:

A) GITOPS predefined tasks that are stored in multiple files, such as where the file structure is used to provide a site design, such as a data center, a cloud computing network or other suitable systems. The file structure can include code for each server, each data switch, each data router, each edge server and other suitable components, to provide a code delivery mechanism.

B) Site configuration data—the names of equipment (servers, switches, routers), IP addresses and other suitable site configuration data.

C) Site Physical location data, such as building and room numbers, street addresses and so forth.

D) Data Center identifiers.

E) Domain Name System (DNS) data and other infrastructure details, such as a site type (ex: Green, Orange, Red), a form factor and other suitable data.

F) Network Details (such as a single file, multiple files, a YAML file with no specified start and end syntax or other suitable data structures).

G) IP address pools, spine and leaf configurations, border gateway protocol, routing networking layer.

H) Dynamic host configuration protocol information, Preboot eXecution Environment (PXE) information.

I) Hardware Details (separate or one file)

K) Physical node configuration data, including firmware, BIOS, out of band addresses, rack layouts, server layouts, host profiles, disk partitioning and so forth.

L) Software details (separate or one file—software to run cloud and applications in cloud all software runs in cloud), operating system and Boot Configurations, hypervisors, container runtimes, repositories.

In one example embodiment, system 100 can be used to perform a series of steps for provisioning a site design. In a first step, a design blueprint, templates or other suitable code structures can be created. In the second step, the design blueprint can be translated to site-specific code documents. Cloud parameters such as Internet Protocol addresses, DNS data, network time protocol (NTP) data and so forth can be applied. Information from inventory planning applications can be translated to virtual network functions and applications details, security configurations can be applied from information security frameworks or guidelines, Artificial Intelligence and Machine Learning toolsets can be used to verify and validate inputs and other suitable functions can also or alternatively be performed. A final step can include committing an instance of the site design to a central repository and triggering of blockchain events for next steps.

Each item of hardware can also have an associated site or location, such as Site 1 through Site N for servers 102A through 102N, routers 106A through 106N, edge servers 108A through 108N and so forth. While the example embodiment shown in system 100 includes server 102A, router 106A and edge server 108A at Site 1 and server 102N, router 106N and edge server 108N at Site N, other suitable combinations of sites and equipment can also or alternatively be used. For example, a first site can be used for all servers and a second site can be used for all routers, different sites can have different numbers and combinations of equipment or other suitable configurations can be used.

FIG. 2 is a diagram 200 of a cloud software installation and update system 110, in accordance with an example embodiment of the present disclosure. Cloud software installation and update system 110 includes site templates system 202, site configuration system 204, site physical configuration system 206, template workflow engine 208 and site validator 210, each of which can be implemented in hardware or a suitable combination of hardware and software.

Site templates system 202 can be implemented as one or more algorithms operating on a processor that cause the processor to select and install one or more code templates on a plurality of devices associated with a cloud computing site or other suitable sites. In one example embodiment, templates can be designed for sites with a predetermined number of components, such as a 10 server cloud, which can include a predetermined number of switches, routers, edge servers and other suitable devices. Site templates system 202 can detect a site configuration from a setting or detected hardware components and can select a suitable template for use with the site, including automated designation of equipment within the site configuration template. Site templates system 202 can also interface with site configuration data system 204, site physical configuration system 206, template workflow engine 208 and site validator 210 to perform automated installation and provisioning of equipment for a cloud computing system or other suitable systems.

Site data configuration system 204 can be implemented as one or more algorithms operating on a processor that cause the processor to configure site equipment with logical device names such as names of servers and routers, with IP addresses and with other suitable site data. In one example embodiment, the site data can be defined in advance for specific site templates, and site data configuration system 204 can be used in conjunction with a local installer to verify that the site data has been properly configured.

Site physical configurations system 206 can be implemented as one or more algorithms operating on a processor that cause the processor to identify physical configurations and locations of servers, routers and so forth. In one example embodiment, a site map or other suitable data can be used to associate specific pieces of equipment with specific floors, rooms, off-site locations and other suitable data.

Template workflow engine 208 can be implemented as one or more algorithms operating on a processor that cause the processor to obtain information from inventory planning software applications and to translate the data to virtual network functions and associated application details, to obtain security configuration data from an information security framework or guidelines, and to perform other suitable functions associated with implementing a template workflow. In one example embodiment, the template workflow engine can install sets of code on equipment in accordance with a predetermined workflow, such as to configure all servers, routers, switches and edge servers first as individual hardware devices, and then to install network software such as virtual network functions and network security, to configure servers associated with a switch or router in parallel and then to interconnect the switches that aggregate traffic from servers directly into a spine or network core, to implement a spine and leaf full-mesh topology, or in other suitable manners.

Site validator 210 can be implemented as one or more algorithms operating on a processor that cause the processor to implement artificial intelligence or machine learning toolsets to verify and validate inputs to hardware components and network systems. In one example embodiment, site validator 210 can use a site blueprint or templates and can verify that the functions associated with the blueprint or templates are configured properly.

FIG. 3 is a diagram 300 of a site data configuration system 204, in accordance with an example embodiment of the present disclosure. Site data configuration system 204 includes initial site data configuration system 302 and site data configuration update system 304, each of which can be implemented in hardware or a suitable combination of hardware and software.

Initial site data configuration system 302 can be implemented as one or more algorithms operating on a processor that cause the processor to generate an initial site data configuration. In one example embodiment, the initial site data configuration can include a file structure, a data structure or other suitable mechanisms for associating site data that is required to configure hardware with specific items of hardware, such as to allow the hardware to be re-configured in the event of the failure of one or more pieces of equipment or for other suitable purposes.

Site data configuration update system 304 can be implemented as one or more algorithms operating on a processor that cause the processor to update a site data configuration to include replacement equipment, new equipment, expanded functions or other suitable site updates. In one example embodiment, the updates can be implemented incrementally, as part of a template that includes multiple items of equipment or in other suitable manners.

FIG. 4 is a diagram 400 of a site physical configuration system 206, in accordance with an example embodiment of the present disclosure. Site physical configuration system 206 includes initial site physical configuration system 402 and site physical configuration update system 404, each of which can be implemented in hardware or a suitable combination of hardware and software.

Initial site physical configuration system 402 can be implemented as one or more algorithms operating on a processor that cause the processor to generate an initial site physical configuration. In one example embodiment, the initial site physical configuration can include equipment identifiers, equipment physical locations or other suitable mechanisms for associating site physical data that is required to identify hardware, such as to allow the hardware to be located in the event of the failure of one or more pieces of equipment or for other suitable purposes.

Site physical configuration update system 404 can be implemented as one or more algorithms operating on a processor that cause the processor to update a site physical configuration to include replacement equipment, new equipment, expanded functions or other suitable site updates. In one example embodiment, the updates can be implemented incrementally, as part of a template that includes multiple items of equipment or in other suitable manners.

FIG. 5 is a diagram 500 of an agent 114, in accordance with an example embodiment of the present disclosure. Agent 114 includes cloud parameter application 502, node bootstrap 504 and platform provisioner system 506, each of which can be implemented in hardware or a suitable combination of hardware and software.

Cloud parameter application 502 can be implemented as one or more algorithms operating on a processor that cause the processor to automatically implement a network Configuration without operator interaction. In one example embodiment, cloud parameter application 502 can interface with network elements over a network data communications medium or other suitable data communications media, including but not limited to network elements that are operating in a compute environment. Cloud parameter application 502 can be configured to read network elements from site configuration documents, to implement discovery processes (such as network discovery dynamic host configuration protocol (DHCP), network address resolution protocol, simple network management protocol (SNMP) or other suitable processes), and to identify configuration gaps between the site configuration documents and the data obtained for each network element through the discovery process based on the information from the site-design. Cloud parameter application 502 can be implemented as an agent that is triggered by a project work flow project. In one example embodiment, when a connection is made to a switch, cloud parameter application 502 can compare data about the switch obtained by discovery to a site design document, can replace data or algorithms that are installed on the switch with new data or algorithms from a site configuration document, can replace data or algorithms that are installed on the switch with new data or algorithms as a function of a difference between a site design document and an installed configuration, can generate failure logs, can create and runs configuration scripts on network elements to provision a network fabric and can perform other suitable functions.

Node bootstrap 504 can be implemented as one or more algorithms operating on a processor that cause the processor to interface with hardware elements such as servers, routers or switches, and to obtain data regarding any configuration gaps based on information from site design documents and discovery processes, to create and implement configuration scripts on hardware elements as they are operating, to provision a computing network or fabric. In one example embodiment, node bootstrap 504 can install and update the firmware on a given physical node using out-of-band network technologies, such as an intelligent platform management interface (IPMI), a PXE, an integrated lights out (ILO) process, a remote access controller (RAC), Redfish application programming interfaces (APIs) or in other suitable manners.

Platform provisioner 506 can be implemented as one or more algorithms operating on a processor that cause the processor to create cloud infrastructure components, such as using Kubernetes, OpenStack or other suitable public or private cloud resources, based on configuration data obtained from the site design documents, Platform provisioner 506 can create cloud computing system APIs that are consistent with the site design data, such as to prevent inadvertent creation of access routes for malicious code or other undesired functionality.

In operation, agent 114 can be used to provision a node in a cloud computing system or other suitable systems, such as by allowing a user to inspect hardware components and to implement changes to the configuration of the algorithms operating on the hardware components, such as to accommodate system configurations that are different from site design documents.

FIG. 6 is a diagram of an algorithm 600 for network element configuration for a cloud computing system, in accordance with an example embodiment of the present disclosure. While algorithm 600 is described in regards to cloud computing, it can also or alternatively be used for enterprise networks, telecommunications data processing or other suitable applications. Algorithm 600 can be implemented on one or more processors.

Algorithm 600 begins at 602, where an agent interfaces with a network element that is operating in a compute environment. The algorithm then proceeds to 604.

At 604, network elements are read from a site configuration document and are compared with data obtained from the network element using discovery processes, such as network discovery DHCP, network address resolution protocol, SNMP or other suitable processes. In one example embodiment, each network element can have a plurality of predetermined data fields, such as those specified in RFC 2132, data obtained from message types pursuant to RFC 2132, RFC 3203, RFC 4388, RFC 6926 and RFC 7724, or other suitable data. The algorithm then proceeds to 606.

At 606, configuration gaps between data from the site design documents and data obtained from the discovery process is identified. If it is determined that a gap exists, the algorithm proceeds to 610, otherwise the algorithm proceeds to 608, where the algorithm terminates.

At 610, it is determined whether a replacement exists for any configuration data. In one example embodiment, a gap can be known based on equipment design parameters or previously observed, and replacement data for the gap can be available. Alternatively, if no replacement data is available, it may be necessary to configure the equipment for operation with the gaps. If it is determined that replacement data exists, the algorithm proceeds to 612, otherwise the algorithm proceeds to 614.

At 612, replacement data is selected for the equipment. In one example embodiment, a list of replacement data can be generated from other components, one or more files or other data structures containing replacement data can be identified or other suitable data can be selected. The algorithm then proceeds to 616.

At 614, the equipment is configured with the difference, if possible. In one example embodiment, configuration processes can be performed, manual configuration can be used or other suitable processes can also or alternatively be used. The configuration data can be saved as a replacement, a failure agent can be initiated, failure logs can be initiated or other suitable processes can also or alternatively be performed. The algorithm then proceeds to 616.

At 616, configuration scripts are created to be run on network elements to configure the network element for operation in the network. In one example embodiment, a configuration script can be an executable script that matches the libraries on the equipment with libraries required by other programs before compiling it from its source code, or other suitable configuration scripts can be created. The algorithm then proceeds to 618.

At 618, the configuration scripts are run. The algorithm then proceeds to 620 where the network fabric is provisioned to incorporate the element, or other suitable processes can also or alternatively be performed. The algorithm then proceeds to 622.

At 622, it is determined whether there are additional elements to be configured. If additional elements are present, then the algorithm returns to 602, otherwise the algorithm proceeds to 608 and terminates.

In operation, algorithm 600 provides for network element configuration for a cloud computing system. Although algorithm 600 is shown as a flowchart, a person of skill in the art will recognize that it can also or alternatively be implemented using object-oriented programming, as a state diagram, as a ladder diagram, as a suitable combination of programming paradigms or in other suitable manners.

FIG. 7 is a diagram of an algorithm 700 for network element data update, in accordance with an example embodiment of the present disclosure. While algorithm 700 is described in regards to cloud computing, it can also or alternatively be used for enterprise networks, telecommunications data processing or other suitable applications. Algorithm 700 can be implemented on one or more processors.

Algorithm 700 begins at 702, where an agent interfaces with a network element that is operating in a compute environment. In one example embodiment, the agent can be generated by one or more algorithms operating on one or more processing platforms, and can include one or more threads, subroutines, objects or other suitable programming constructs. The algorithm then proceeds to 704.

At 704, network element data is read from a site configuration document, such as by one or more algorithms operating on a processor, and is compared with data obtained from the network element using discovery processes performed by the algorithms or other suitable data processing systems, such as network discovery DHCP, network address resolution protocol, SNMP or other suitable processes to identify configuration gaps. In one example embodiment, each network element can have a plurality of predetermined data fields, such as those specified in RFC 2132, data obtained from message types pursuant to RFC 2132, RFC 3203, RFC 4388, RFC 6926 and RFC 7724, or other suitable data. The algorithm then proceeds to 706.

At 706, it is determined whether configuration gaps exist, such as by processing the site configuration data with data obtained from one or more network elements using one or more processors. The determination can be made at a central processors, in a distributed processing architecture or in other suitable embodiments. If it is determined that configuration gaps exist, the algorithm proceeds to 710, otherwise the algorithm proceeds to 708 and terminates.

At 710, it is determined whether an update exists to address or resolve the configuration gaps. If it is determined that an update exists, the algorithm proceeds to 712, otherwise if no update exists, the algorithm proceeds to 714.

At 712, the firmware on a given physical node is updated, such as by using an out of band network in combination with IPMI, PXE, ILO, RAC's, Redfish APIs or other suitable processes. The algorithm then proceeds to 714.

At 714, configuration scripts are created while the firmware is running on hardware elements to provision the compute fabric. In one example embodiment, the hardware elements can have dedicated processors and an external processor can generate the configuration scripts, or other suitable processes can also or alternatively be used. The algorithm then proceeds to 716.

At 716, the configuration scripts are executed while the firmware is running on hardware elements to provision the compute fabric. The algorithm then proceeds to 718.

At 718, the firmware is installed and updated on a given physical node using an out of band network and IPMI, PXE, ILO, RAC, a Redfish API or other suitable technology. The algorithm then proceeds to 720.

At 720, it is determined whether additional elements need to be updated. If it is determined that additional elements require an update, the algorithm returns to 702, otherwise the algorithm proceeds to 708 and terminates.

In operation, algorithm 700 provides for updating network element configurations for a cloud computing system. Although algorithm 700 is shown as a flowchart, a person of skill in the art will recognize that it can also or alternatively be implemented using object-oriented programming, as a state diagram, as a ladder diagram, as a suitable combination of programming paradigms or in other suitable manners.

FIG. 8 is a diagram of an algorithm 800 for generating cloud computing APIs, in accordance with an example embodiment of the present disclosure. While algorithm 800 is described in regards to cloud computing, it can also or alternatively be used for enterprise networks, telecommunications data processing or other suitable applications. Algorithm 800 can be implemented on one or more processors.

Algorithm 800 begins at 802, where a site design data set is read. In one example embodiment, the site design data set can be read by a processor operating under control of one or more algorithms stored in a working memory that cause the processor to form a data structure for analysis of site design for a cloud computing system or other suitable systems, such as to create a first data structure that represents a site design format and a second data structure that represents associated components that have been installed, or other suitable data structures. The algorithm then proceeds to 804.

At 804, the algorithm implements an automated software deployment process to scale and manage the site design. In one example embodiment, the algorithm can use Kubernetes, OpenStack or other suitable resources to create cloud infrastructure as a function of information from the site design data set, or other suitable processes can also or alternatively be used. The algorithm then proceeds to 806.

At 806, the algorithm generates APIs to the deployed software for the site design. In one example embodiment, the APIs can be for interfacing components of the site design, interfacing the site design with external components, or other suitable APIs can also or alternatively be created.

In operation, algorithm 800 provides for generating cloud computing APIs. Although algorithm 800 is shown as a flowchart, a person of skill in the art will recognize that it can also or alternatively be implemented using object-oriented programming, as a state diagram, as a ladder diagram, as a suitable combination of programming paradigms or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for configuring a network, comprising:
a network software installation system operating on a first processor and configured to install a current version of one or more algorithms on each of a plurality of site-specific hardware items and to configure each of the plurality of site-specific hardware items to interoperate with each other; and
an agent operating on a second processor remote from the first processor and configured to modify the one or more algorithms for one of the plurality of site-specific hardware items from a user interface by accessing the site-specific hardware item using an out of band network.

2. The system of claim 1 wherein the plurality of site-specific hardware items are configured for cloud computing.

3. The system of claim 1 wherein the plurality of site-specific hardware items are configured for an enterprise network.

4. The system of claim 1 wherein the plurality of site-specific hardware items comprise a plurality of servers, a plurality of switches, a plurality of routers and a plurality of edge servers.

5. The system of claim 1 wherein the algorithms are for a plurality of servers and are configured for specific ones of the plurality of servers.

6. The system of claim 1 wherein the algorithms are for a plurality of servers and are configured for specific ones of a plurality of switches.

7. The system of claim 1 wherein the algorithms are for a plurality of servers and are configured for specific ones of a plurality of switches and specific ones of a plurality of routers.

8. The system of claim 1 further comprising a site data configuration system operating on the second processor and configured to install specific predetermined site data on each server of a plurality of servers.

9. The system of claim 1 further comprising a site data configuration system operating on the second processor and configured to install specific predetermined site data on each switch of a plurality of switches.

10. The system of claim 1 further comprising a site physical configuration system operating on the second processor and configured to install specific predetermined site physical configuration data on each server of a plurality of servers.

11. A method for configuring a network, comprising:
installing a current version of one or more algorithms on each of a plurality of site-specific hardware items using a network software installation system operating on a first processor under algorithmic control;
configuring each of the plurality of site-specific hardware items to interoperate with each other using the network software installation system;
reading a configuration of one of the plurality of hardware items using an agent operating on a second processor remote from the first processor; and
modifying the one or more algorithms on the one of the plurality of hardware items from a user interface of the agent by accessing the site-specific hardware item using an out of band network and the user interface of the agent.

12. The method of claim 11 wherein the plurality of site-specific hardware items are configured for cloud computing and the algorithms for one of the site-specific hardware items are modified using the user interface.

13. The method of claim 11 wherein the plurality of site-specific hardware items are configured for an enterprise network and a configuration script for one of the site-specific hardware items is modified using the user interface.

14. The method of claim 11 wherein the plurality of site-specific hardware items comprise a plurality of servers, a plurality of switches, a plurality of routers and a plurality of edge servers and a gap in the plurality of site-specific hardware items is identified using the agent.

15. The method of claim 11 wherein the algorithms are for a plurality of servers and are configured for specific ones of the plurality of servers using the agent.

16. The method of claim 11 wherein the algorithms are for a plurality of servers and are configured for specific ones of a plurality of switches using the agent to modify a configuration script.

17. The method of claim 11 wherein the algorithms are for a plurality of servers and are configured for specific ones of a plurality of switches and specific ones of a plurality of routers using the agent to provision a network element.

18. The method of claim 11 further comprising configuring a site data configuration system operating on the second processor to install specific predetermined site data on each server of a plurality of servers.

19. The method of claim 11 further comprising configuring a site data configuration system operating on the second processor to install specific predetermined site data on each switch of a plurality of switches.

20. The method of claim 11 further comprising configuring a site physical configuration system operating on the second processor to install specific predetermined site physical configuration data on each server of a plurality of servers.

* * * * *